(12) United States Patent
Filardo et al.

(10) Patent No.: US 12,264,666 B2
(45) Date of Patent: Apr. 1, 2025

(54) UNDULATING TRANSDUCER FOR ENERGY HARNESSING AND PROPULSION APPARATUSES, METHODS AND SYSTEMS

(71) Applicant: Pliant Energy Systems Inc., Brooklyn, NY (US)

(72) Inventors: Benjamin Pietro Filardo, New York, NY (US); Nicholas M. Cavaliere, Belford, NJ (US)

(73) Assignee: Pliant Energy Systems Inc., Brooklyn, NY (US)

(*) Notice: Subject to any disclaimer, the term of this patent is extended or adjusted under 35 U.S.C. 154(b) by 168 days.

(21) Appl. No.: 18/120,548

(22) Filed: Mar. 13, 2023

(65) Prior Publication Data
US 2024/0309840 A1  Sep. 19, 2024

(51) Int. Cl.
| | |
|---|---|
| *F04B 43/06* | (2006.01) |
| *F03B 13/10* | (2006.01) |
| *F03B 17/06* | (2006.01) |
| *F03D 15/00* | (2016.01) |

(52) U.S. Cl.
CPC ............ *F04B 43/06* (2013.01); *F03B 13/10* (2013.01); *F03B 17/06* (2013.01); *F03D 15/00* (2016.05); *F05B 2220/706* (2013.01)

(58) Field of Classification Search
CPC .. F04D 9/28; F04B 43/06; F04B 19/22; F04B 9/10–1178; F04B 17/00; F04B 17/02; F04B 45/033; Y02E 10/30; F03B 13/187; F03B 13/181–1815; F03B 13/1805–1815; F03B 13/10; F03B 17/06

USPC ................................................. 417/330, 332
See application file for complete search history.

(56) References Cited

U.S. PATENT DOCUMENTS

| | | | |
|---|---|---|---|
| 3,961,863 A * | 6/1976 | Hooper, III | F04B 43/086 92/39 |
| 4,258,270 A | 3/1981 | Tornkvist | |
| 10,190,570 B1 * | 1/2019 | Filardo | B63H 1/37 |
| 2007/0079997 A1 | 4/2007 | Chan et al. | |
| 2010/0194116 A1 * | 8/2010 | Mahawili | H02K 7/183 136/258 |

(Continued)

OTHER PUBLICATIONS

PCT International Search Report and Written Opinion, mailed Jun. 2, 2023, for PCT/US23/015090, filed Mar. 13, 2023.

*Primary Examiner* — Thomas Fink
(74) *Attorney, Agent, or Firm* — Irell and Manella LLP

(57) ABSTRACT

Embodiments disclosed may serve the function of a pump, a generator, or a propulsion system. Two flexible fins are coupled via their longitudinal inner edges to fin coupling modules. An external fluid flow causes traveling fin undulations. The angle of the fins relative to each other changes as undulations travel along the fins which can be translated through the fin coupling modules into mechanical work, powered by the external fluid flow. The mechanical work of the fin coupling modules may be the cyclical extension and contraction of pistons or bellows incorporated into the fin coupling modules, which may draw ambient fluid during their extension cycles and compress fluid during their contraction cycles to create a pump. The pistons or bellows may also be sealed from ambient fluid but connected through conduits through which contained fluid is exchanged in a continuous circulation of fluid to power a pump or a turbine.

22 Claims, 17 Drawing Sheets

(56) References Cited

U.S. PATENT DOCUMENTS

| | | | |
|---|---|---|---|
| 2010/0308590 A1* | 12/2010 | Rohrer | F03B 13/188 290/53 |
| 2012/0175880 A1* | 7/2012 | Filardo | B63H 1/37 60/527 |
| 2012/0247097 A1* | 10/2012 | Ross | F03B 13/188 60/497 |
| 2012/0299303 A1 | 11/2012 | Bellamy et al. | |
| 2013/0069368 A1* | 3/2013 | Park | F03B 13/18 290/53 |
| 2014/0230426 A1* | 8/2014 | Tuokkola | F03B 13/14 60/497 |
| 2016/0061180 A1* | 3/2016 | Eavis | F03B 13/182 417/330 |
| 2017/0016424 A1* | 1/2017 | Filardo | F03B 17/061 |
| 2019/0055917 A1* | 2/2019 | Filardo | F03B 13/10 |
| 2019/0331090 A1* | 10/2019 | Filardo | F03B 17/06 |
| 2022/0170438 A1* | 6/2022 | Filardo | F03B 13/00 |
| 2024/0309840 A1* | 9/2024 | Filardo | F03B 17/06 |

* cited by examiner

UNDULATING TRANSDUCER FOR ENERGY HARNESSING AND PROPULSION APPARATUSES, METHODS AND SYSTEMS

This invention was made with government support under contract #SC 0019962 awarded by the Department of Energy. The government has certain rights in the invention.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights

FIELD

The present innovations generally address energy harnessing devices with undulating fin transducers in a fluid environment and vehicles with undulating fin transducers for propulsion in a fluid environment and include UNDULATING TRANSDUCER FOR ENERGY HARNESSING AND PROPULSION APPARATUSES, METHODS AND SYSTEMS.

BACKGROUND

A wide variety of methods and apparatuses have been developed over time to harness the energy of moving fluid currents, from the water wheel to modern wind turbines. That energy may be harnessed to perform mechanical work or, in some cases, may be converted to electrical energy for storage or distribution. In addition, machines have been developed to produce the opposite effect, converting electrical or mechanical energy into forces applied to fluids. These allow, for example, for fluids to be pumped (e.g. from one location to another, from low elevations to higher elevations etc.). They also are the basis for many vehicle propulsion systems, whereby energy is applied to impart a force to a surrounding ambient fluid in the direction opposite that of the desired motion of the vehicle.

SUMMARY

Embodiments of the disclosed UNDULATING TRANSDUCER FOR ENERGY HARNESSING AND PROPULSION APPARATUSES, METHODS AND SYSTEMS may operate as a pump, a generator, a propulsion system, and/or the like. For example, two or more flexible fins exhibiting approximately sinusoidal undulations may be coupled via their longitudinal inner edges to fin coupling modules. When exposed to an external fluid flow, resulting differential pressures on the fins cause the fin undulations to travel in the direction of external fluid flow. The angle of the fins relative to each other changes as undulations travel along the fins. This change of angle between the fins is translated through the fin coupling modules into mechanical work, powered by the external fluid flow. The mechanical work of the fin coupling modules may, for example, be the cyclical extension and contraction of pistons, bellows, and/or the like incorporated into the fin coupling modules.

In one embodiment, the pistons or bellows draw ambient fluid during their extension cycles and compress fluid enclosed, e.g., by check valves, during their contraction cycles into a common outlet to create a pump. In another embodiment, the pistons or bellows are sealed from ambient fluid but connected through conduits through which contained fluid is exchanged between them that may power a pump, turbine, and/or the like.

In another embodiment, the bellows or pistons of the fin coupling modules are fluidically coupled via conduits to antagonistic bellows or pistons coupled to, e.g., a cam, crank assembly, and/or the like, and the shaft of the cam or crank is rotationally coupled to a generator, a type of pump, and/or the like operated via continuous rotation.

In yet another embodiment, the cam or crank may be rotationally coupled to a motor which powers the antagonistic bellows or pistons coupled to the bellows or pistons of the fin coupling modules to induce wave-travel along the fin. In this embodiment, actuated fins May serve to provide propulsion for vehicles traveling through fluid. If this embodiment is fixed to a solid substrate while in a fluid, actuated undulation travel along the fin may serve the purpose of moving ambient fluid, such as to provide gentle movement, mixing, and/or circulation of fluids, powders, particles, and/or the like.

BRIEF DESCRIPTION OF THE DRAWINGS

The accompanying appendices and/or drawings illustrate various non-limiting, example, innovative aspects in accordance with the present descriptions.

DETAILED DESCRIPTION OF DRAWINGS

Figure 1:
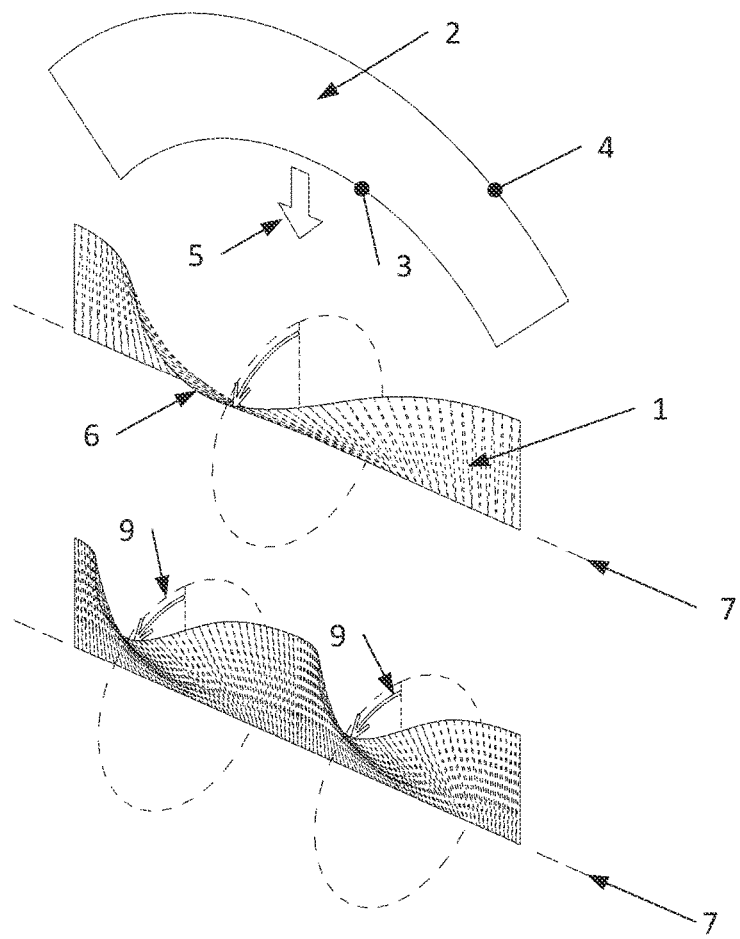
FIG. 1 illustrates a method of creating a fin in some embodiments.

Embodiments of the disclosed UNDULATING TRANSDUCER FOR ENERGY HARNESSING AND PROPULSION APPARATUSES, METHODS AND SYSTEMS may include apparatuses with fins 1, which are flexible members exhibiting periodic strained undulations. One method for creating a fin is illustrated in FIG. 1., with an arched, flexible sheet-like material 2 having an inner edge radius 3 being smaller than an outer edge 4 radius. A deforming force 5, or forces 5, may be applied to create a strained, sinusoidal wave-like deformation 6, or deformations 6, with a hyperbolic geometry and a longitudinal axis 7. When fixed in ambient fluid 8 flow, FIG. 2, hydrodynamic loads may cause wave-like deformation 6 in the fins 1 to travel in the direction of ambient fluid 8 flow. Wave-like deformation 6 travel translates into a reciprocating rotational action 9 of the fin about a longitudinal axis 7, FIG. 1.

Figure 2:
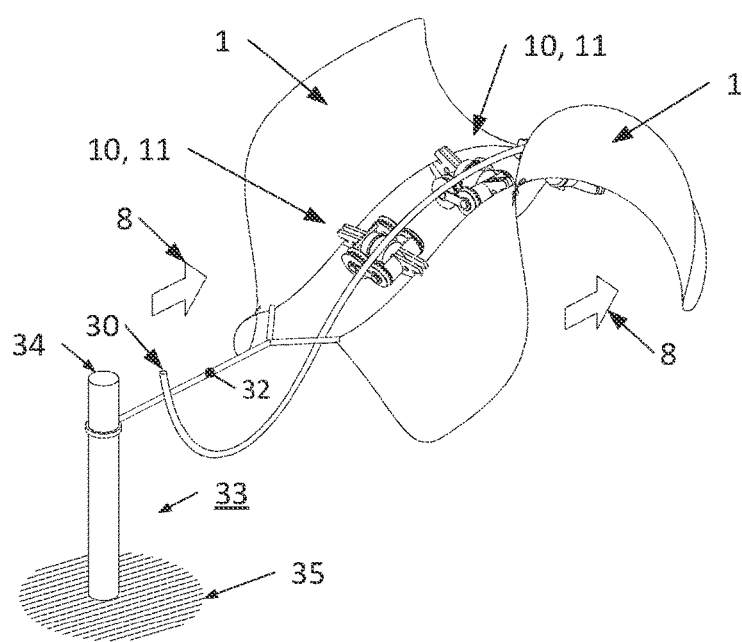
FIG. 2 illustrates a pump implementation tethered to an immovable substrate in some embodiments.
Figure 3:
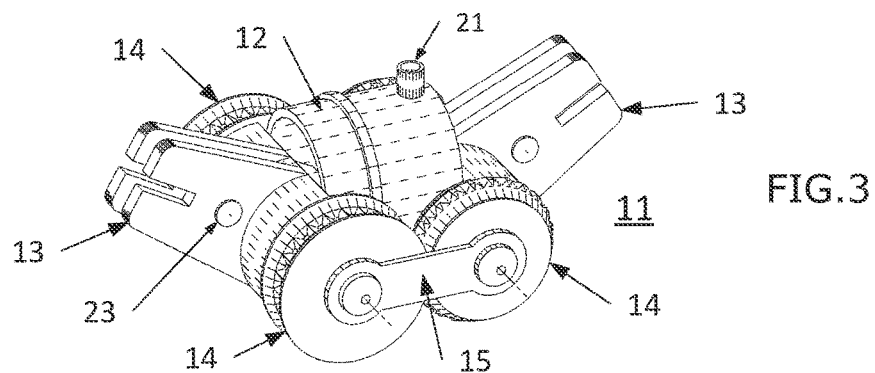
FIGS. 3-5 illustrate a fin coupling module in three positions in some embodiments.
Figure 4:
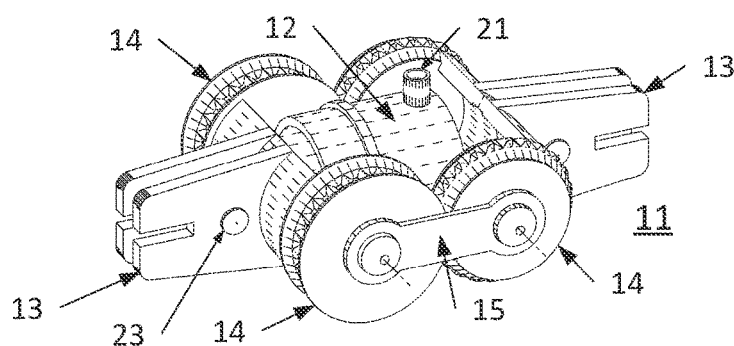
Figure 5:
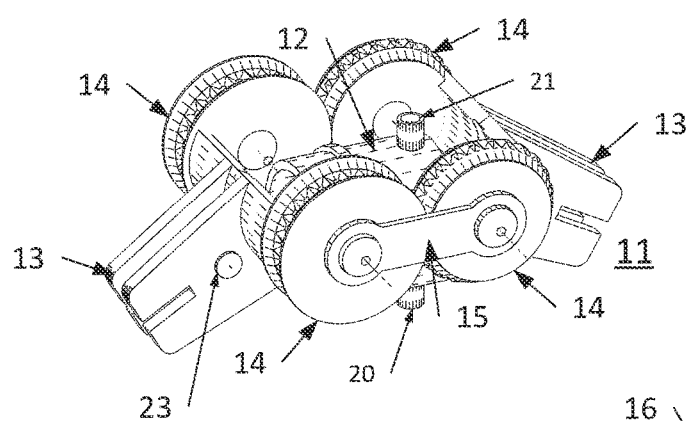
Figure 6:
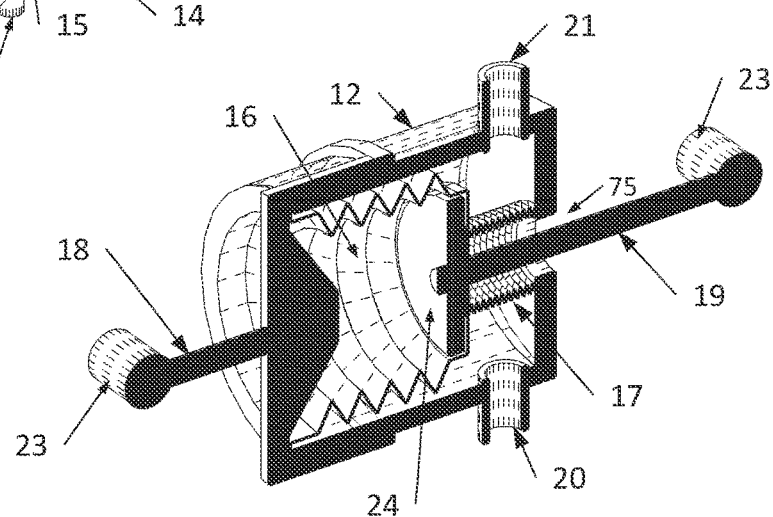
FIG. 6 illustrates a section through a component of a pump implementation in some embodiments.

The fins 1 may be coupled to each other, e.g., via fin coupling modules 10, FIG. 2, that convert the reciprocating rotational action 9 of the fins 1 into useful work, such as pumping. In one embodiment, a type one fin coupling module 11 is used to perform the work. FIGS. 3-5 show examples of a type one fin coupling module 11 in three positions of fin rotation. FIG. 6 shows a section through the pump chamber 12 of a type one fin coupling module 11.

Figure 7:
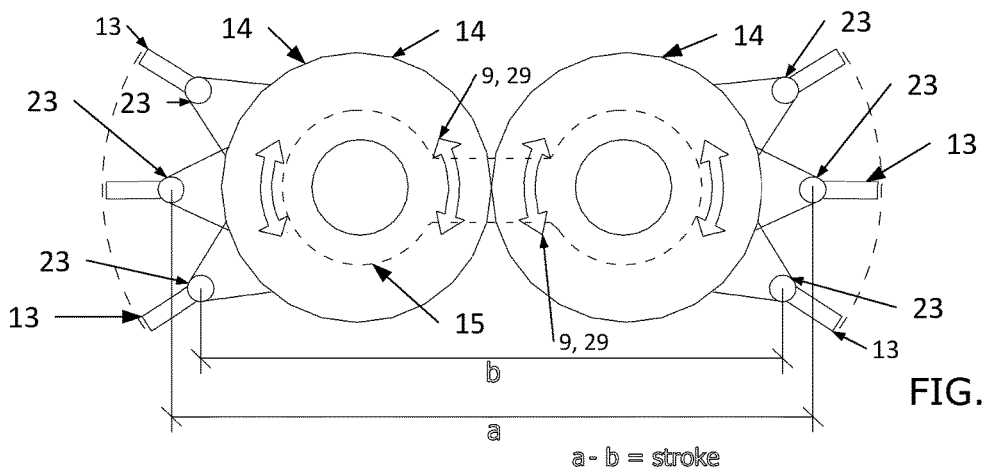
FIG. 7 is a diagrammatic illustration of a fin coupling module in three positions in some embodiments.

Implementations of a type one fin coupling module 11 may comprise vertebrae 13 that attach to the inner edge 3 of the fins 1, of rotors 14, cross bars 15, a large bellows 16, a small bellows 17, a first piston arm 18 and a second piston arm 19, and a pump chamber 12. FIG. 7 illustrates an example of how the rotational nodes 23 move closer together and farther apart as the vertebrae 13 rotate the rotors 14 partially clockwise and counterclockwise 29. The first piston arm 18 and second piston arm 19, being coupled to the rotational nodes 23, move towards each other and away from each other with rotation 29 of the rotors 14, FIGS. 8-13. The first piston arm 18, being fixed to the pump chamber 12, moves towards or away from the internal plate 24 which is fixed to the second piston arm 19. The second piston arm 19 pushes the internal plate 24 towards or away from the pump chamber 12. The closed ends of the large bellows 16 and closed ends of the small bellows 17 being fixed to the internal plate 24, reciprocal rotation of the rotors 14 antagonistically compresses or extends the large bellows 16 and small bellows 17.

Figure 8:
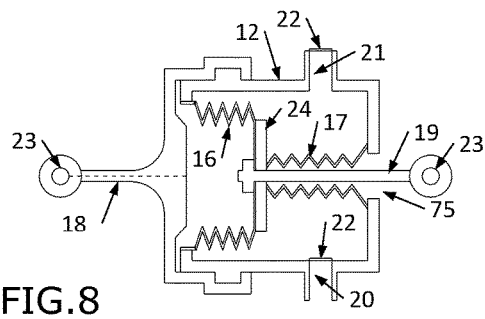
FIG. 8 illustrates a section through a component of a pump implementation in a first position in some embodiments.
Figure 10:
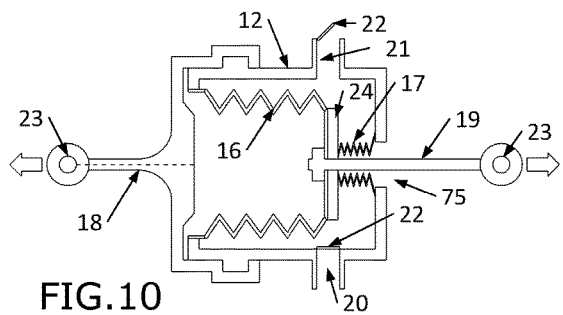
FIG. 10 illustrates a section through a component of a pump implementation in a second position in some embodiments.
Figure 12:
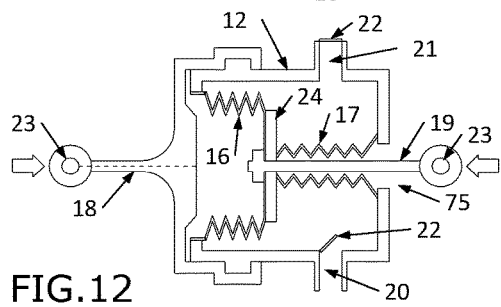
FIG. 12 illustrates a section through a component of a pump implementation in a third position in some embodiments.
Figure 14:
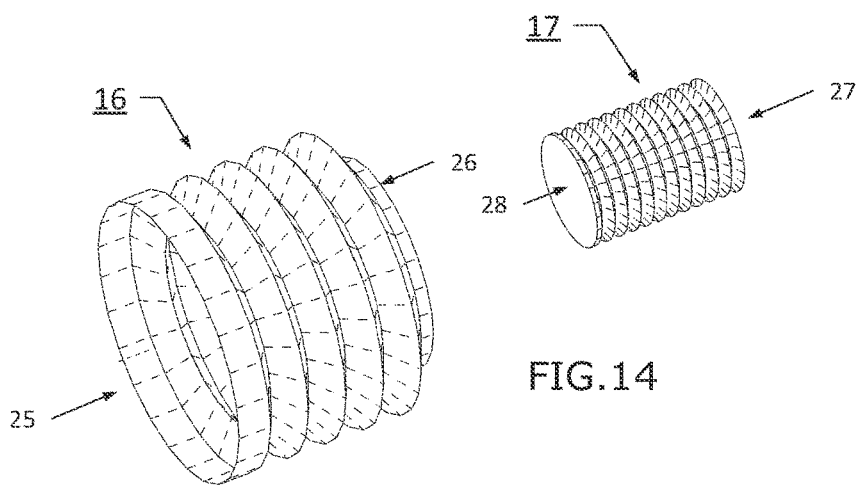
FIG. 14 is an illustration of bellows from a pump implementation in some embodiments.

The pump chamber 12 has an inlet 20 and an outlet 21 with check valves 22, FIGS. 8, 10, 12. The first piston arm 18 and second piston arm 19 are rotationally coupled to the vertebrae 13 via rotational nodes 23. The first piston arm 18 is fixed to the pump chamber 12 and the second piston arm 19 is fixed to an internal plate 24, FIG. 6. The large bellows 16 has an open end 25 and a closed end 26. The small bellows 17 has an open end 27 and a closed end 28, FIG. 14. The closed end 26 of the large bellows 16 and the closed end 28 of the small bellows 17 are fixed to the internal plate 24 of the second piston arm 19. The open end 25 of the large bellows 16 is externally fixed to the pump chamber 12 and the open end of the small bellows 17 is fixed about an opening 75 in the closed end of the pump chamber 12, allowing the second piston arm 19 to pass through the closed end of the pump chamber 12.

Figure 9:
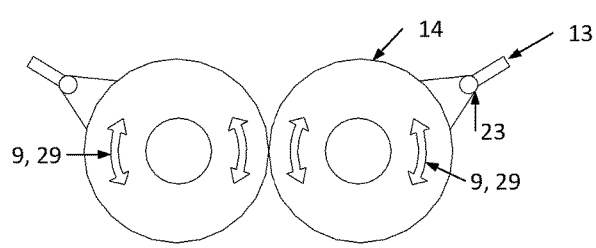
FIG. 9 is a diagrammatic illustration of the FIG. 8 component in a first position in some embodiments.

FIG. 8 is a section showing an example of the arrangement and position of components coupled to the pump chamber 12 corresponding to the rotor 14 position shown diagrammatically in FIG. 9, where the vertebrae 13 are rotated fully upwards and the nodes 23 of the first piston arm 18 and second piston arm 19 are closest together, so that the large bellows 16 is compressed and the small bellows 17 is extended.

Figure 11:
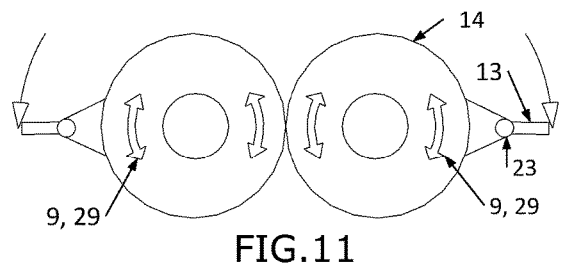
FIG. 11 is a diagrammatic illustration of the FIG. 10 component in a second position in some embodiments.

FIG. 10 is a section showing an example of the arrangement and position of components coupled to the pump chamber 12 corresponding to the rotor 14 position and motion shown diagrammatically in FIG. 11, where the vertebrae 13 move to their midpoint of rotation 29, and the nodes 23 of the first piston arm 18 and second piston arm 19 move furthest apart, so that the large bellows 16 becomes extended and the small bellows 17 becomes compressed.

Figure 13:
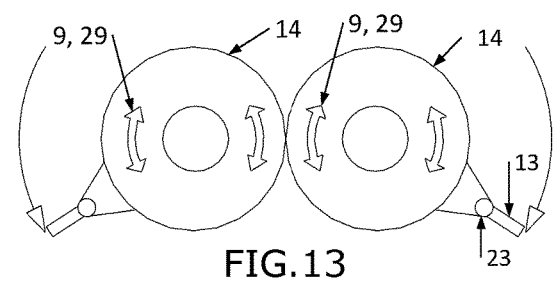
FIG. 13 is a diagrammatic illustration of the FIG. 12 component in a third position in some embodiments.

FIG. 12 is a section showing the arrangement and position of components coupled to the pump chamber 12 corresponding to the rotor 14 position and motion shown diagrammatically in FIG. 13, where the vertebrae 13 move to their most downward point of rotation 29, and the nodes 23 of the first piston arm 18 and second piston arm 19 have moved closest together, so that the large bellows 16 is compressed and the small bellows 17 is extended.

During the phase of operation when the first piston arm 18 and second piston arm 19 are moving towards each other, the large bellows 16 is being compressed while the small bellows 17 is being extended, FIG. 12, creating negative pressure inside the pump chamber 12 that draws fluid in via the pump chamber inlet 20. While fluid is being drawn into the pump chamber 12, check valves 22 open the inlet 20 and close the outlet 21. During the phase of operation when the first piston arm 18 and second piston arm 19 are moving away from each other, the large bellows 16 is extending and the small bellows 17 is compressing, FIG. 10, creating positive pressure in the pump chamber 12 and expelling fluid from the pump chamber 12 via the pump chamber outlet 21. During expulsion of fluid from the pump chamber 12, the check valve 22 at the pump chamber inlet 20 closes.

Figure 15:
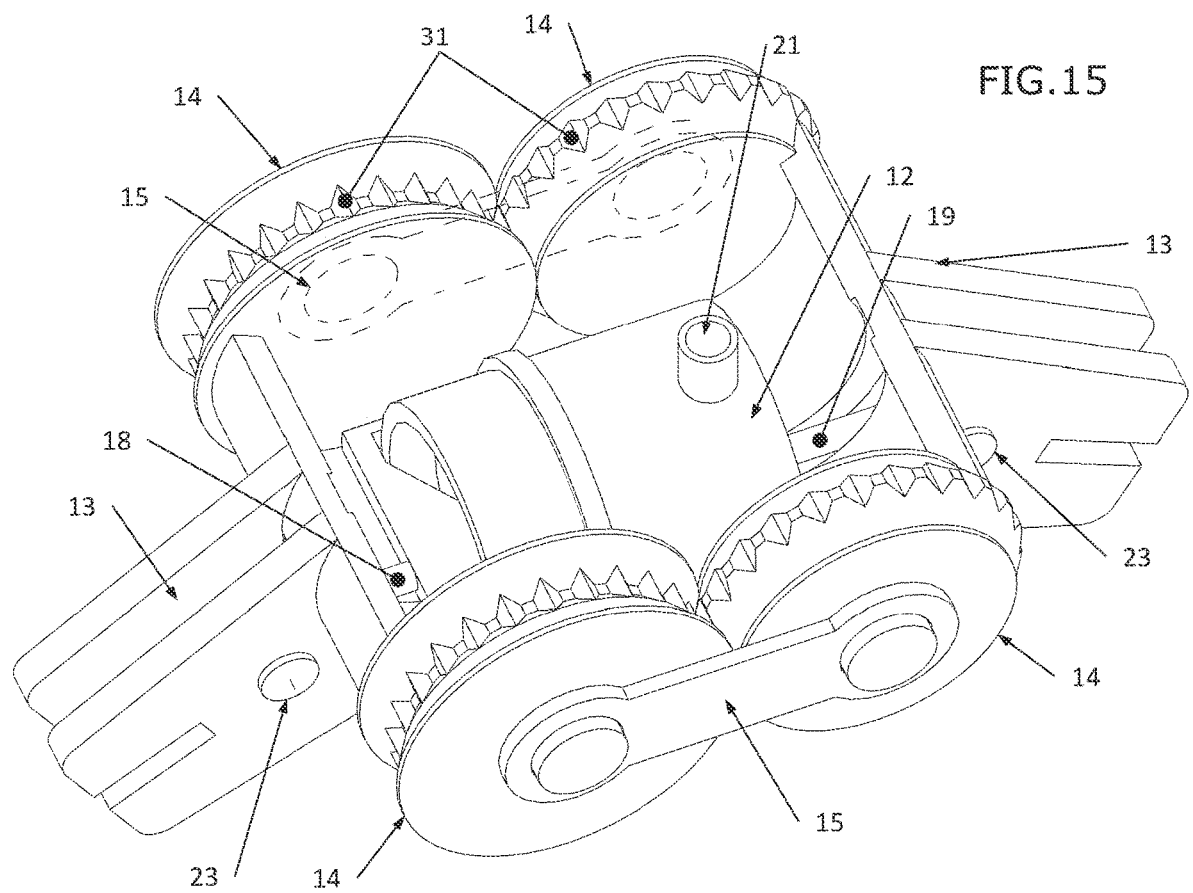
FIG. 15 is an illustration of the fin coupling module of a pump implementation in some embodiments.

In some implementations, the wave-like deformation 6 of the two fins 1, and therefore the rotational positions of the fins 1, may be kept synchronized, e.g., via toothed metering 31 of the rotors 14. The rotors may be held together by the cross bars 15 to which they are rotationally coupled, FIG. 15. The fins 1 may be coupled to a tether 32 which in turn is fixed to an immovable object 33, such as a pylon 34 in a riverbed 35, such that ambient fluid 8 flow across the fins 1 causes wave-like deformation 6 to travel in the direction of ambient fluid 8 flow, causing rotation of the rotors 14, and fluid pumping, FIGS. 2, 16.

Figure 16:
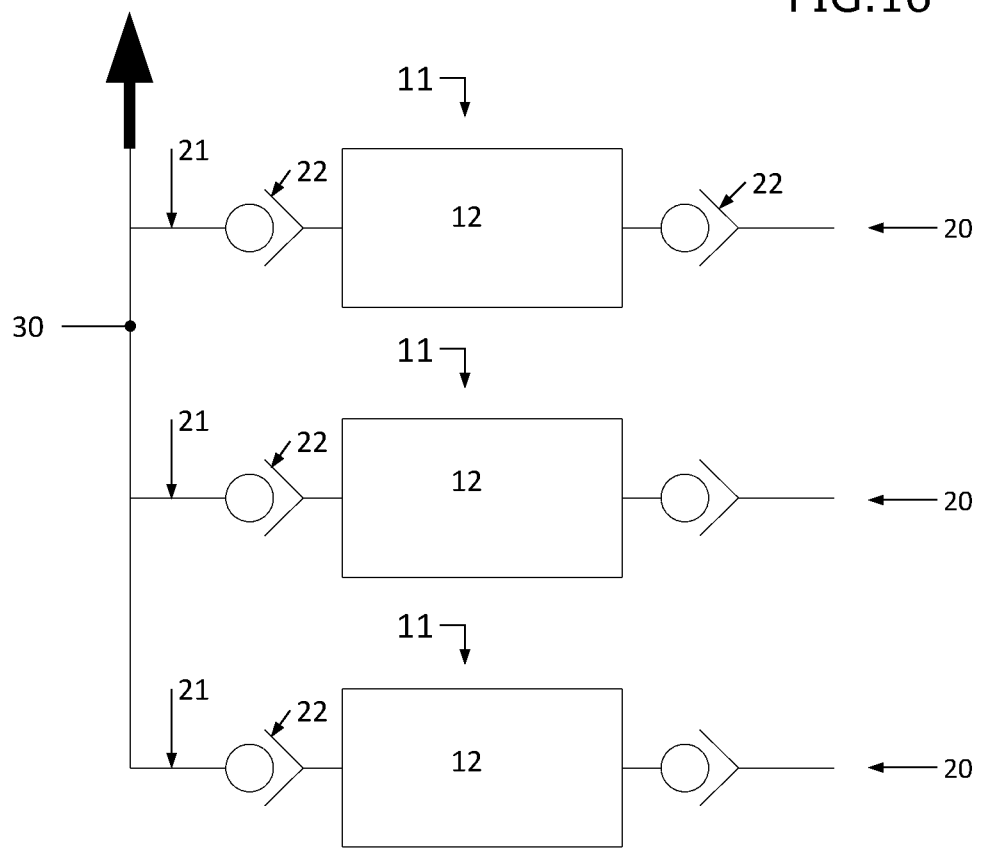
FIG. 16 is a diagrammatic circulation diagram of a pump implementation in some embodiments.

In some implementations, the pump chambers 12 of one or more type one fin coupling modules 10, 11 may exit into a common conduit 30 through which the pumped fluid is moved, FIG. 16.

Another fin coupling module 10 is a type two fin coupling module 36, FIGS. 17-22. Implementations of a type two fin coupling module 36 may be comprised of two vertebrae lever arms 37 coupled to the fins 1, a structural bracket 38 comprised of two halves, an upper bellows 39 and a lower bellows 40, a central chamber 41 having double sided linear gears 42 at either side of the central chamber 41, FIG. 19. The upper bellows 39 and lower bellows 40 each have a fluid inlet 43 and a fluid outlet 44. Each vertebra lever arm 37 has toothed gearing 45 that interfaces with the linear gearing 42 on either side of the central chamber 41. Between the upper bellows 39 and structural bracket 38 is an upper cap 46 with openings for the fluid inlet 43 and fluid outlet 44 of the upper bellows 39. Between the lower bellows 40 and structural bracket 38 is a lower cap 47 with an opening for the fluid inlet 43 of the lower bellows 40. The upper open end of the lower bellows 40 is open to a void 60 in the central chamber 41. The void 60 in the central chamber 41 is open to the fluid outlet 48 of the central chamber 41. A lower threaded ring-lid 49 couples the lower bellows 40 to a lower threaded portion 50 of the central chamber 41. An upper threaded ring-lid 51 couples the upper bellows 39 to an upper threaded portion 52 of the central chamber 41.

Figure 18:
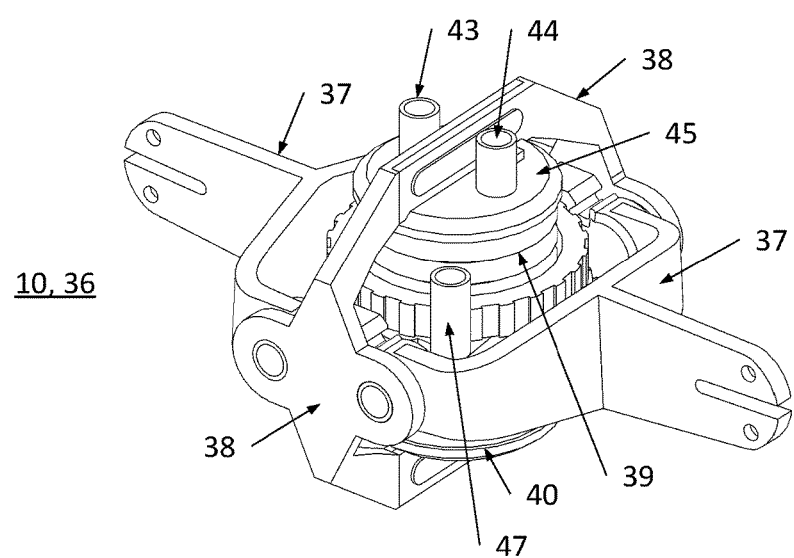
FIG. 18 illustrates another fin coupling module of a pump implementation in some embodiments.
Figure 19:
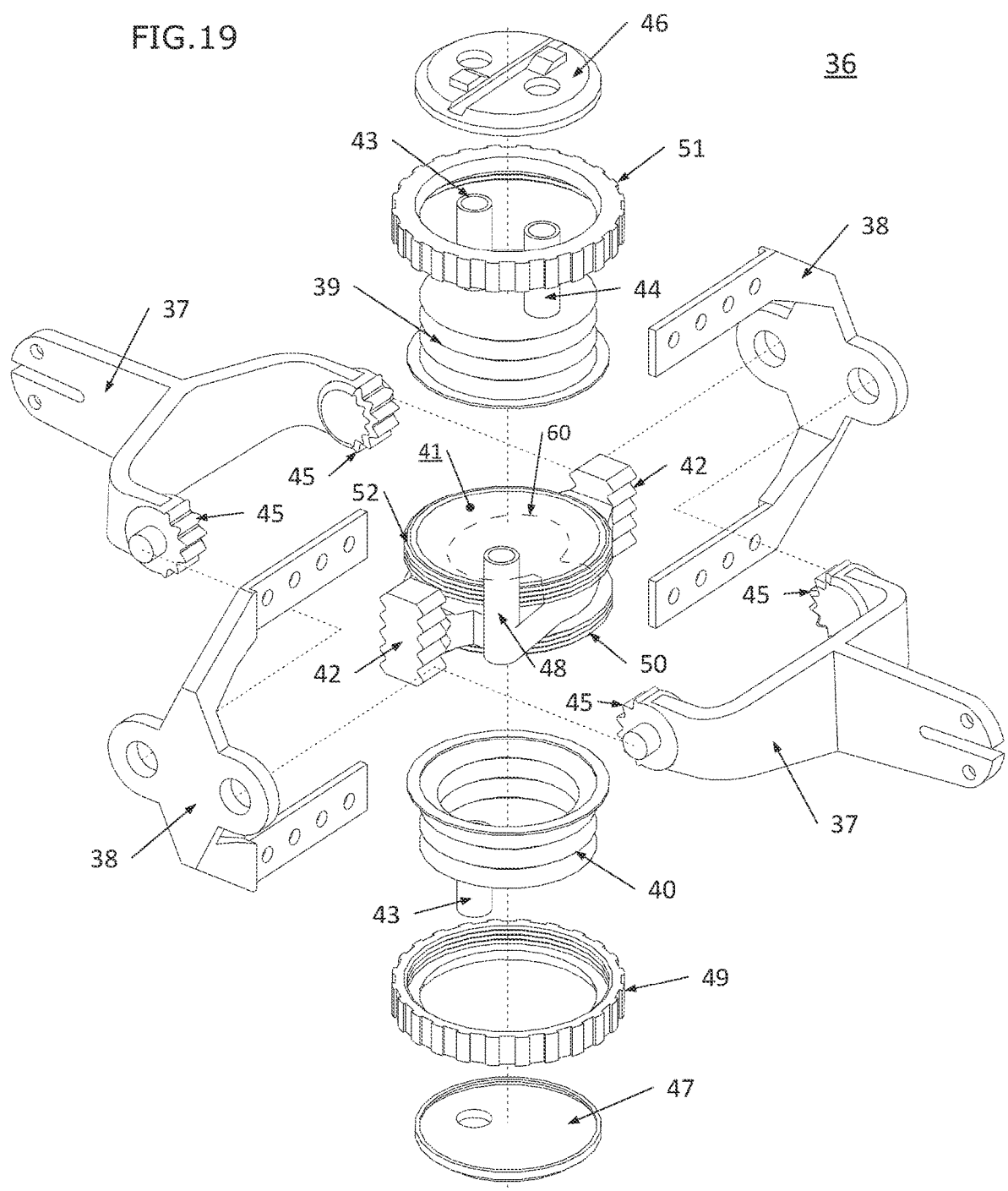
FIG. 19 is an exploded isometric illustration of a fin coupling module of a pump implementation in some embodiments.
Figure 20:
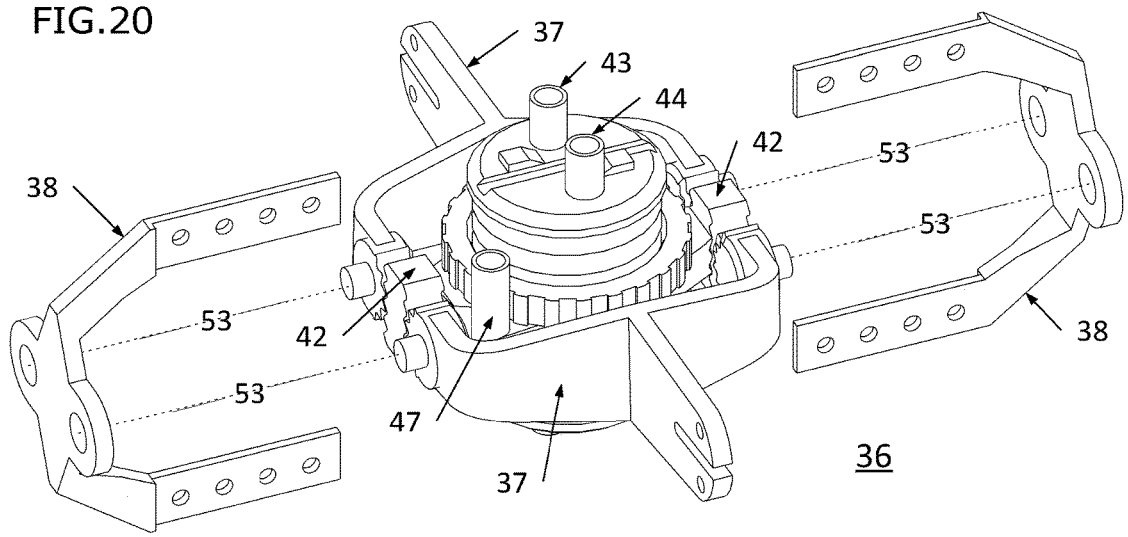
FIG. 20 is a partially exploded isometric illustration of a fin coupling module of a pump implementation in some embodiments.

During assembly, the two halves of the structural bracket 38 are brought together FIG. 20 and pinned or otherwise mechanically fixed to each other, FIG. 18. The vertebra lever arms 37 are rotationally coupled to the structural brackets 38 about the rotational axes 53 FIG. 20 of the vertebrae lever arms 37. Rotation of the vertebrae lever arms 37 causes the central chamber 41 to move upwards or downwards. When the central chamber 41 is moved upwards, the upper bellows 39 is compressed against the upper part of the structural bracket 38 while the lower bellows 40 is extended. When the vertebrae lever arms 37 are rotating downwards, the upper bellows 39 extends while the lower bellows 40 is compressed against the lower part of the structural bracket 38.

Figure 21A:
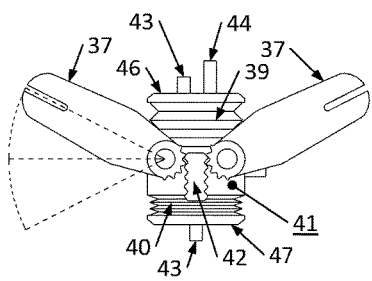
FIGS. 21A-C illustrate the bellows and lever arm configuration in three positions of a fin coupling module of a pump implementation in some embodiments.
Figure 21B:
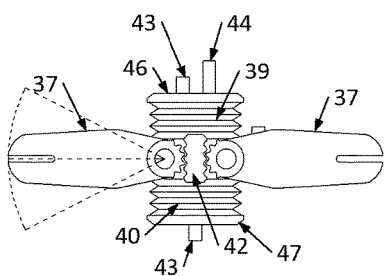
Figure 21C:
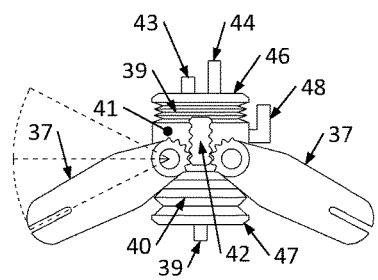
Figure 22A:
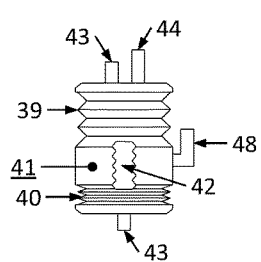
FIGS. 22A-C illustrate the bellows and lever arm configuration in three positions of a fin coupling module of a pump implementation in some embodiments.
Figure 22B:
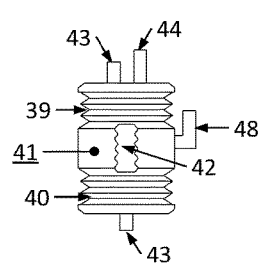
Figure 22C:
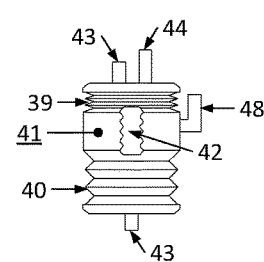

FIGS. 21A-C shows diagrammatic views of the changing angle of the vertebra lever arm 37 in three positions, which are the fully upward position, the midpoint, and the fully downward position, to illustrate how the gearing of the vertebra lever arms 37 raise and lower the central chamber 41, antagonistically compressing or extending the upper bellows 39 and lower bellows 40. In FIGS. 21A-C the structural brackets 38 are removed for visual clarity. FIGS. 22A-C show the same sequence as FIGS. 21A-C, but with the structural brackets 38 and vertebrae lever arms 37 removed for visual clarity. FIG. 21A corresponds with FIG. 22A, FIG. 21B corresponds with FIG. 22B, and FIG. 21C corresponds with FIG. 22C.

Figure 23:
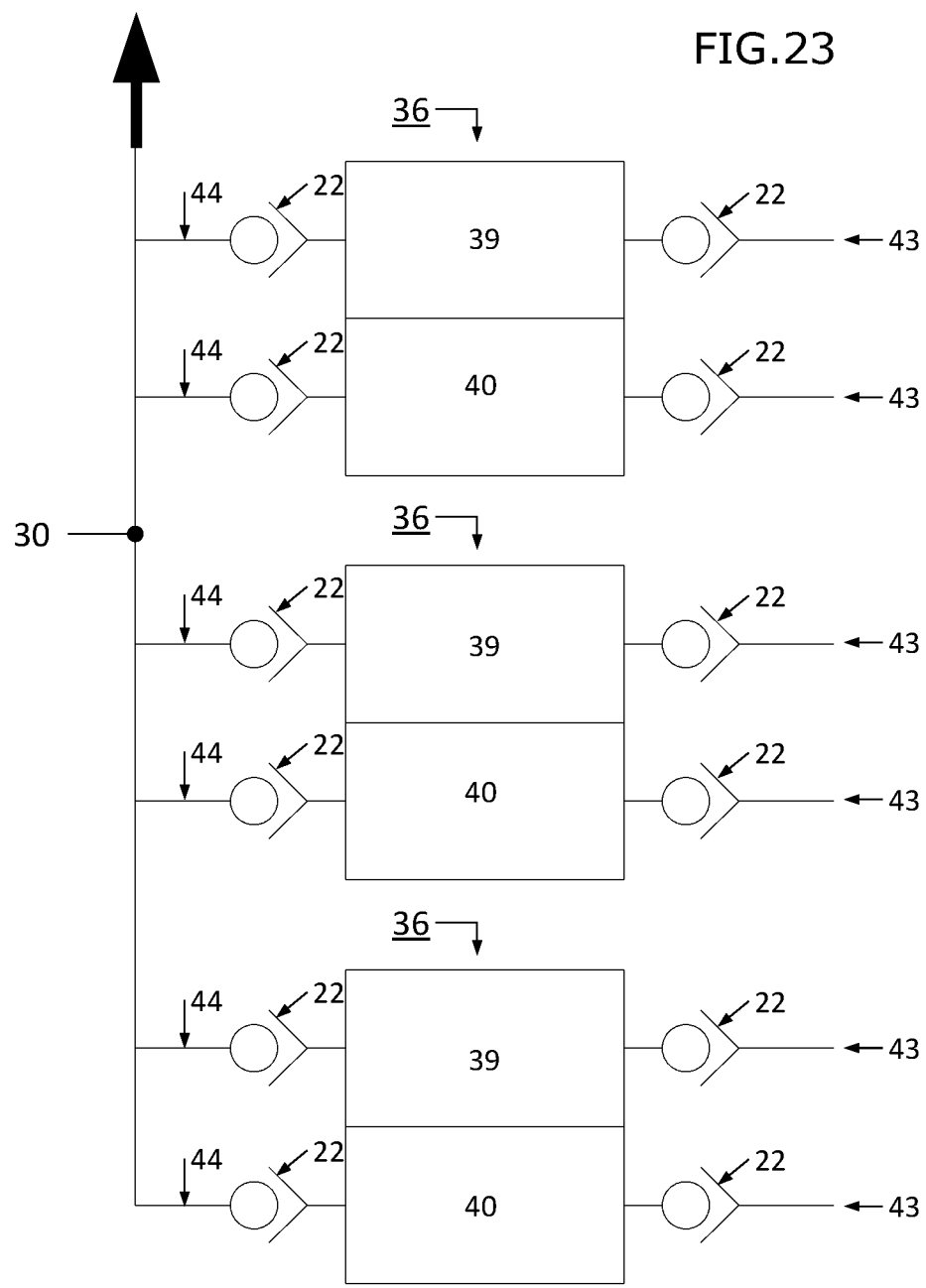
FIG. 23 is a circulation diagram of a pump implementation in some embodiments.

FIG. 23 is an example of a system fluid flow diagram showing ambient fluid 8 entering the upper bellows 39 and lower bellows 40 of a type two fin coupling module 36. Check valves 22 ensure that water is drawn in through the inlets 43 of the upper bellows 39 and lower bellows 40 and expelled through the outlets 44 into a common conduit 30.

The fins 1 as described herein serve as transducers actuated by ambient fluid 8 flow to power fin coupling modules 10, 11, 36 that pump fluid into bellows 16, 39, 40 and out into a common conduit 30, FIGS. 16, 23. The fins 1, fin coupling modules 10, 11, 36 and conduits 30 comprise a first category of pump apparatuses.

The angular positions, or phase positions, of the vertebrae 13 or lever arms 37 of the fin coupling modules 10, 11, 36, are a translation of the phase position of the wave-like fin deformations 6 along the fin 1. The vertebrae 13 or lever arms 37 of the fin coupling modules 10, 11, 36 are coupled to the bellows 16, 39, 40, and so the phase positions of the bellows 16, 39, 40 correlate with the phase position of the wave-like fin deformations 6.

In a first implementation of a second category of pump apparatus, the powered circulation of internal fluid rotates the shaft 54 of a centrifugal pump 55, and/or other type of pump, that can be powered by a rotating shaft 54. This second category of pump apparatus can be conceptualized as a pump powering a pump, FIG. 24. Each bellows 16 of the fin coupling modules 10, 11 is fluidically coupled via conduits, tubes, and/or the like 56 to an antagonistic bellows 57. The antagonistic bellows 57 may be coupled to a cam, crank, and/or the like 58 coupled to a shaft 59 and gearbox 60. The rotational position of the cam or crank 58 is matched with the phase positions of the wave-like fin deformations 6. This phase matching of the cam or crank 58 to the wave-like fin deformations 6 allows the wave-like fin deformations 6, induced by ambient fluid 8 flow, to power continuous rotation of the cam or crank 58 shaft 59 which may be rotationally coupled to a gearbox 60. The gearbox 60 may rotate a centrifugal pump 55 or other type of pump that can be powered by a rotating shaft 54 with a fluid inlet 61 and fluid outlet 62. The cam or crank 58 may be enclosed in a structural case 63.

Figure 25:
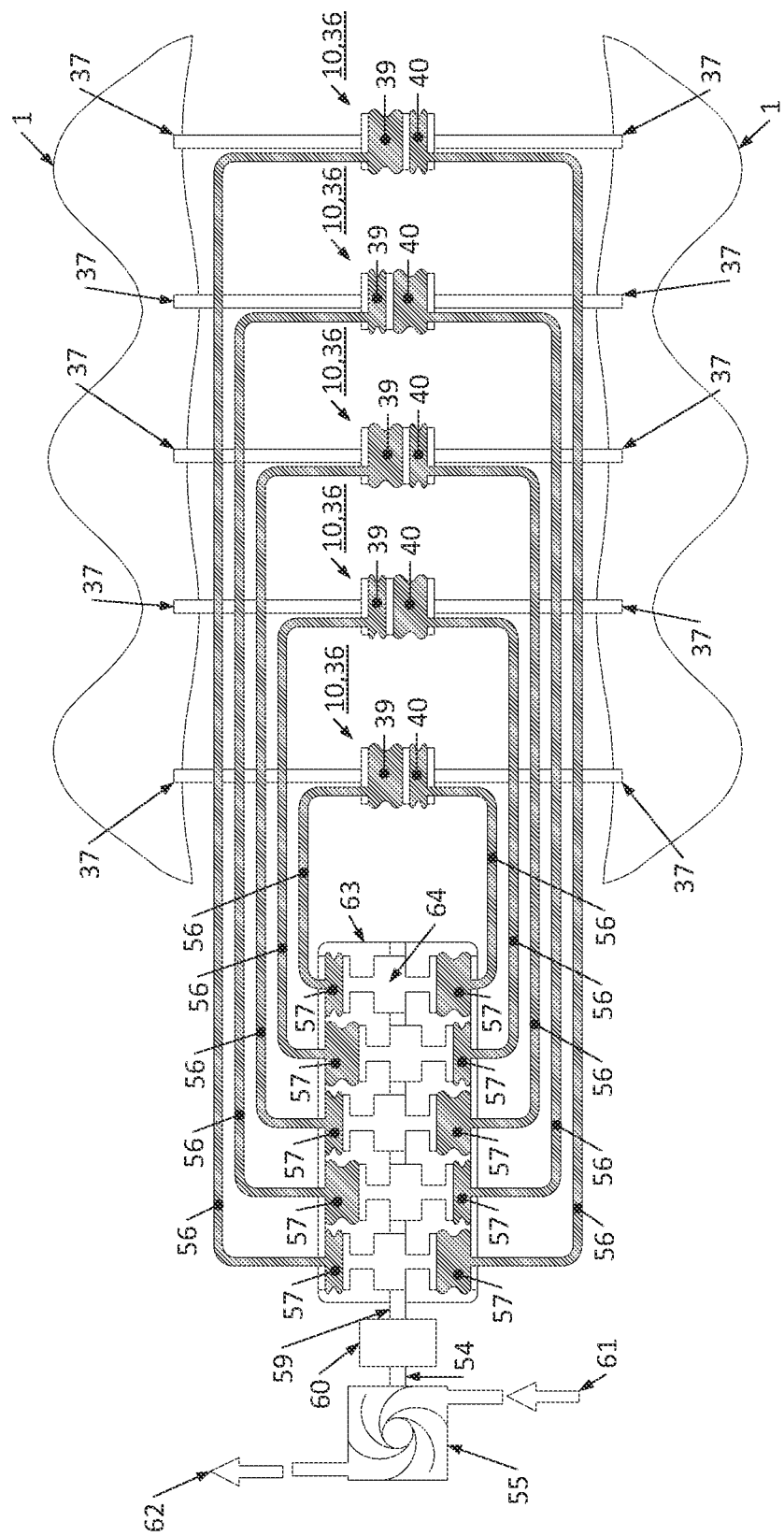
FIG. 25 is a diagrammatic illustration of another second category of pump implementation in some embodiments.

FIG. 25 illustrates a second implementation of the second category of pump apparatus in which the powered circulation of internal fluid powers a centrifugal pump 55 or other type of pump that can be powered by a rotating shaft 54. Each bellows 39, 40 of the fin coupling modules 10, 36 is fluidically coupled via conduits, tubes, and/or the like 56 to an antagonistic bellows 57. The antagonistic bellows 57 may be coupled to a double cam, crank, and/or the like 64 coupled to a shaft 59 and gearbox 60. The rotational position of the double cam or crank 64 is matched with the phase positions of the wave-like fin deformations 6. This phase matching of the double cam or crank 64 to the wave-like fin deformations 6 allows the wave-like fin deformations 6, induced by ambient fluid flow 8, to power continuous rotation of the double cam or crank 64 shaft 59 which may be rotationally coupled to a gearbox 60. The gearbox 60 may rotate a centrifugal pump 55 or other type of pump that can be powered by a rotating shaft 54 with a fluid inlet 61 and fluid outlet 62. The cam or crank 62 may be enclosed in a structural case 63

Figure 17:
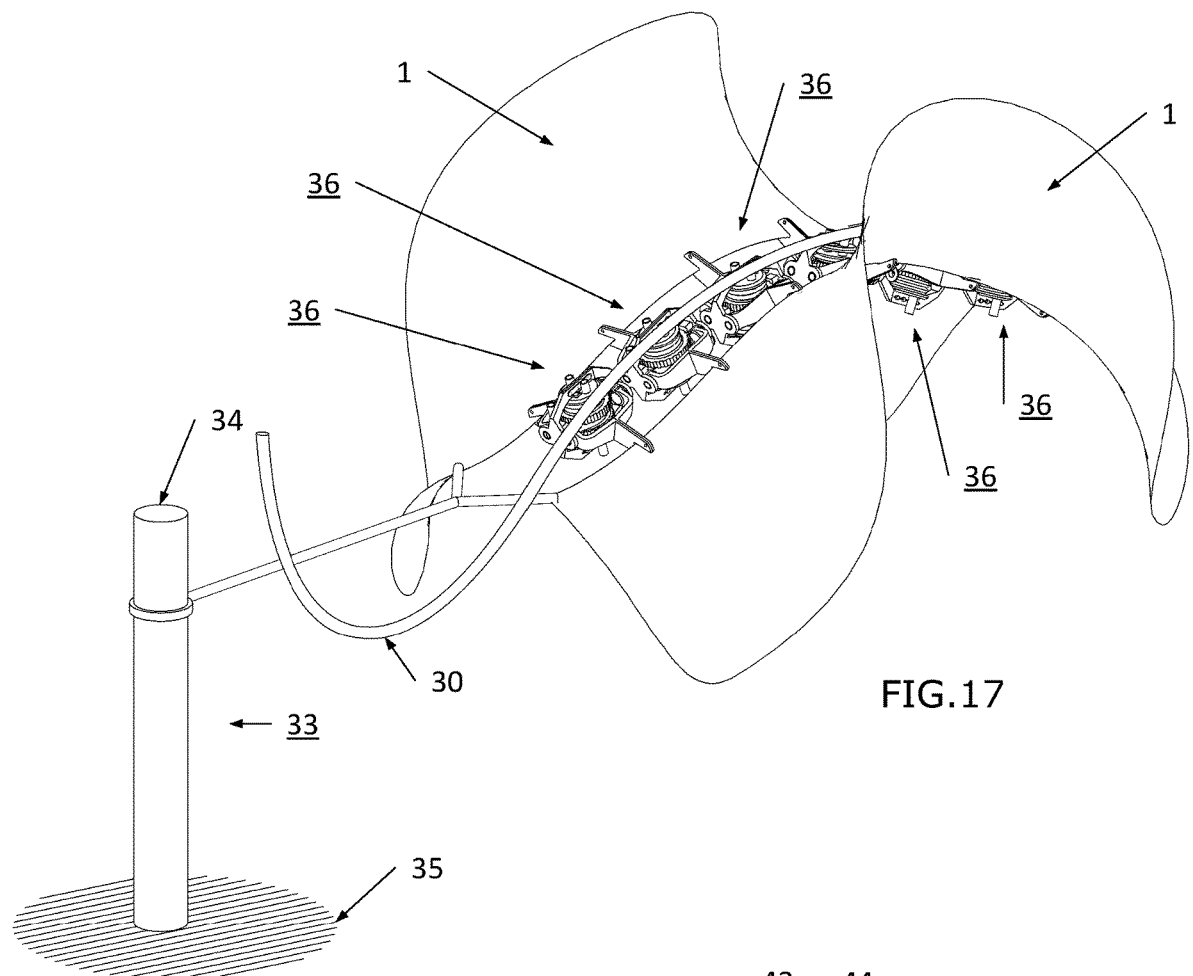
FIG. 17 illustrates another pump implementation tethered to an immovable substrate in some embodiments.
Figure 24:
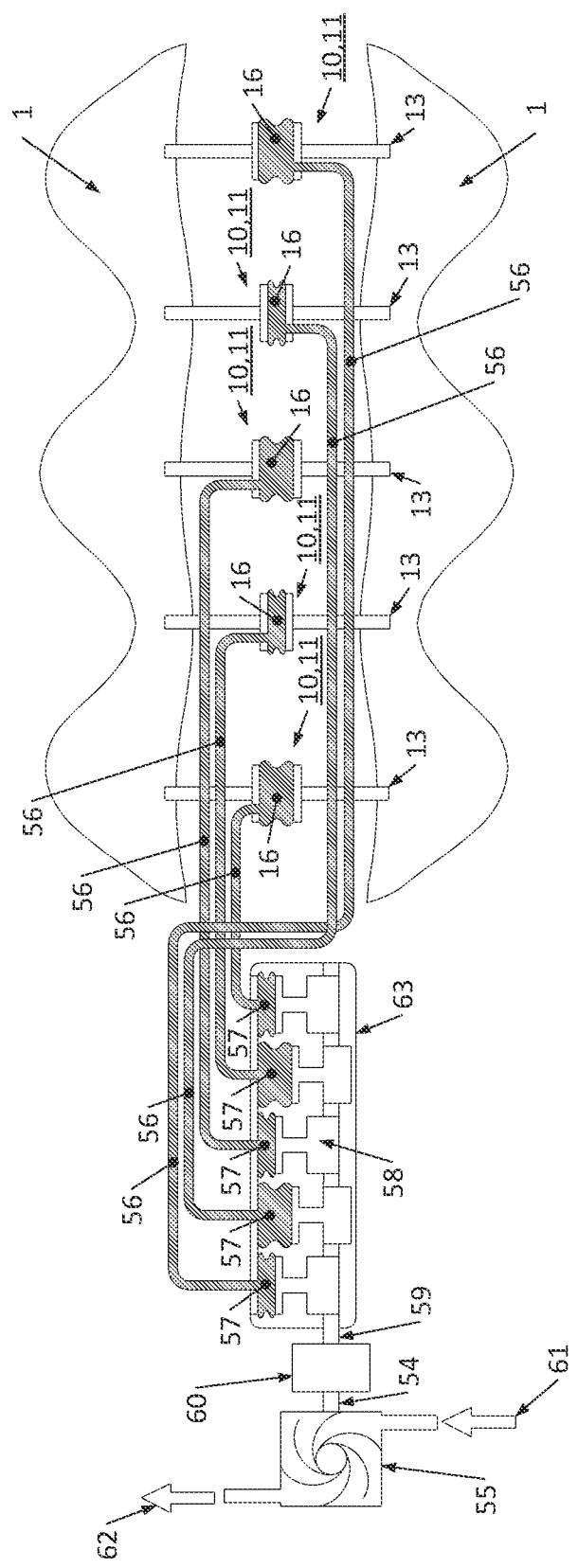
FIG. 24 is a diagrammatic illustration of second category of pump implementation in some embodiments.

As discussed above, bellows 16, 39, 40 may be used as mechanical transducers to convert the kinetic energy of ambient fluid 8 flow into the mechanical energy of wave-like undulations 6 along fins 1 to pump water FIG. 2, FIG. 17, or to actuate a cam or crank 58 FIG. 24, or double cam or crank 64 FIG. 25 that pumps water. The cam or crank 58, or double cam or crank 64 of the apparatuses in FIG. 24 and FIG. 25 may also be utilized to turn a gearbox 60 which may turn an electromagnetic generator 65.

Figure 26:
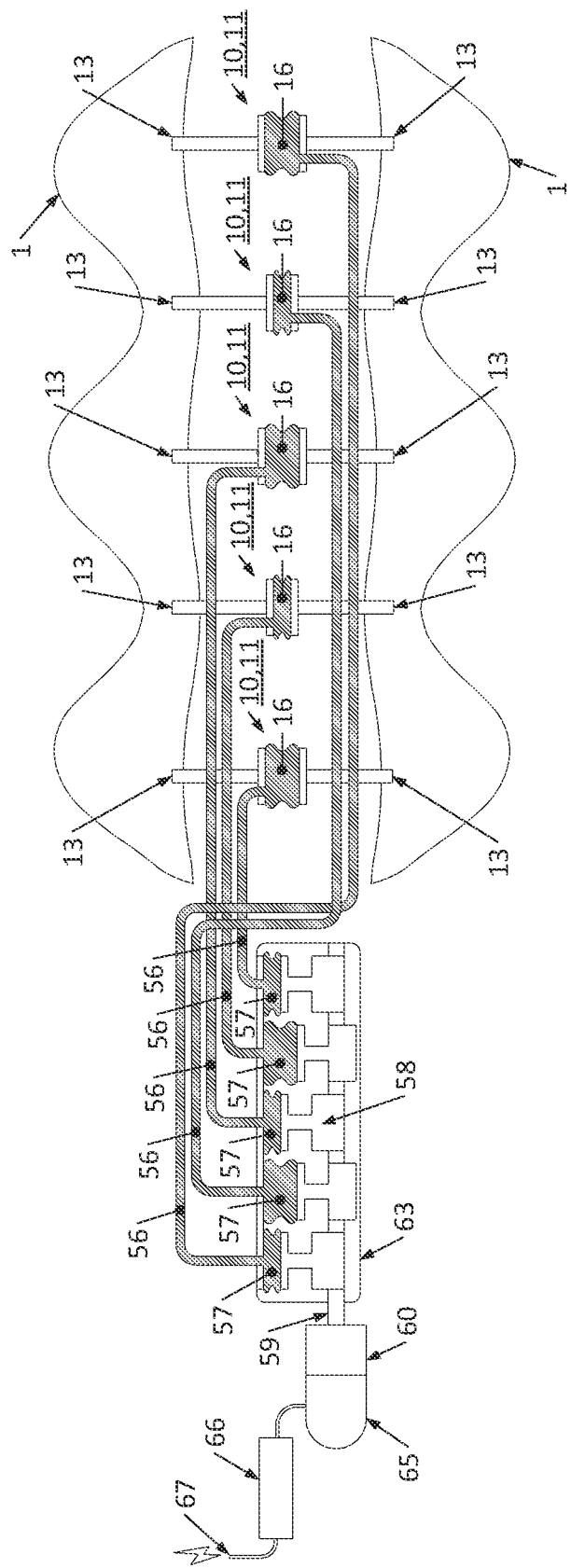
FIG. 26 is a diagrammatic illustration of a first generator implementation in some embodiments.

In a first generator implementation, the cam or crank 58 may be rotationally coupled to a gearbox 60 which may be coupled via a rotating shaft 59 to a generator 65, which may, e.g., charge a battery 66 and/or send electricity through a cable 67 to another destination, FIG. 26. In a second generator implementation, the double cam or crank 64 may be rotationally coupled to a gearbox 60 which may be coupled via a rotating shaft 59 to a electromagnetic generator 65, which may charge a battery 66 or send electricity through a cable 67 to another destination, FIG. 27.

Figure 27:
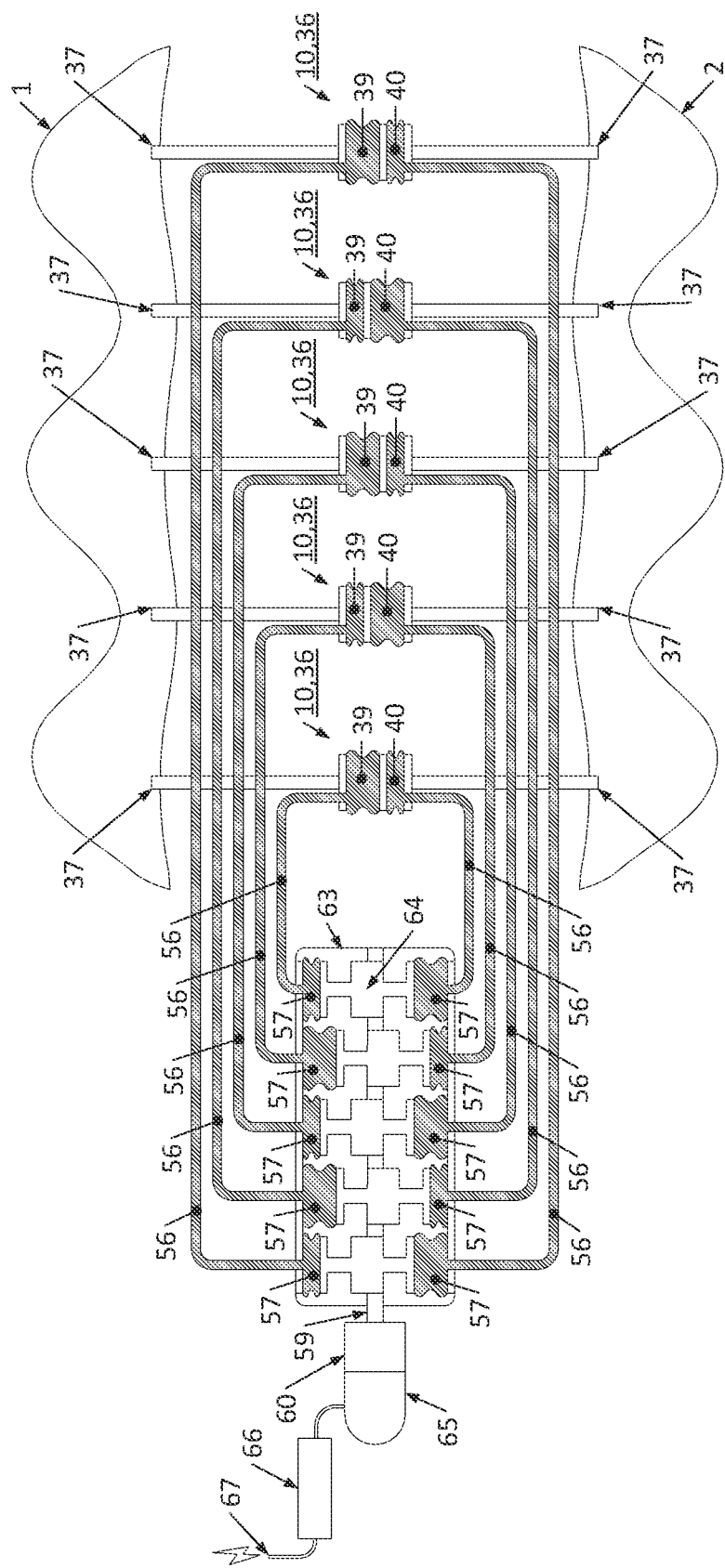
FIG. 27 is a diagrammatic illustration of a second generator implementation in some embodiments.
Figure 28:
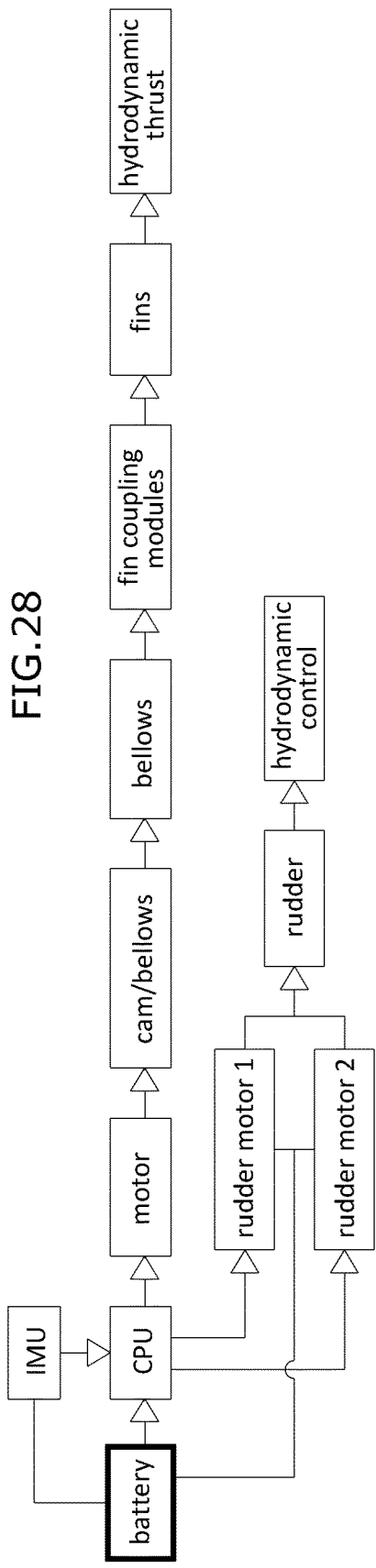
FIG. 28 is a diagram of control and energy flow of a vehicle implementation in some embodiments.

The first generator implementation, FIG. 26 and second generator implementation, FIG. 27 may be adapted to function as vehicles that travel through fluid by reversing mechanical action and energy transfer, e.g., utilizing a battery 66 or other power source to produce kinetic energy at the fins 1, FIG. 28 rather than harnessing kinetic energy input at the fins 1 to produce energy for the battery 66 or other output 67. In some implementations, the first and second generator implementations may be adapted to function both as vehicles and as generators in alternate or concurrent operational modes.

Figure 29:
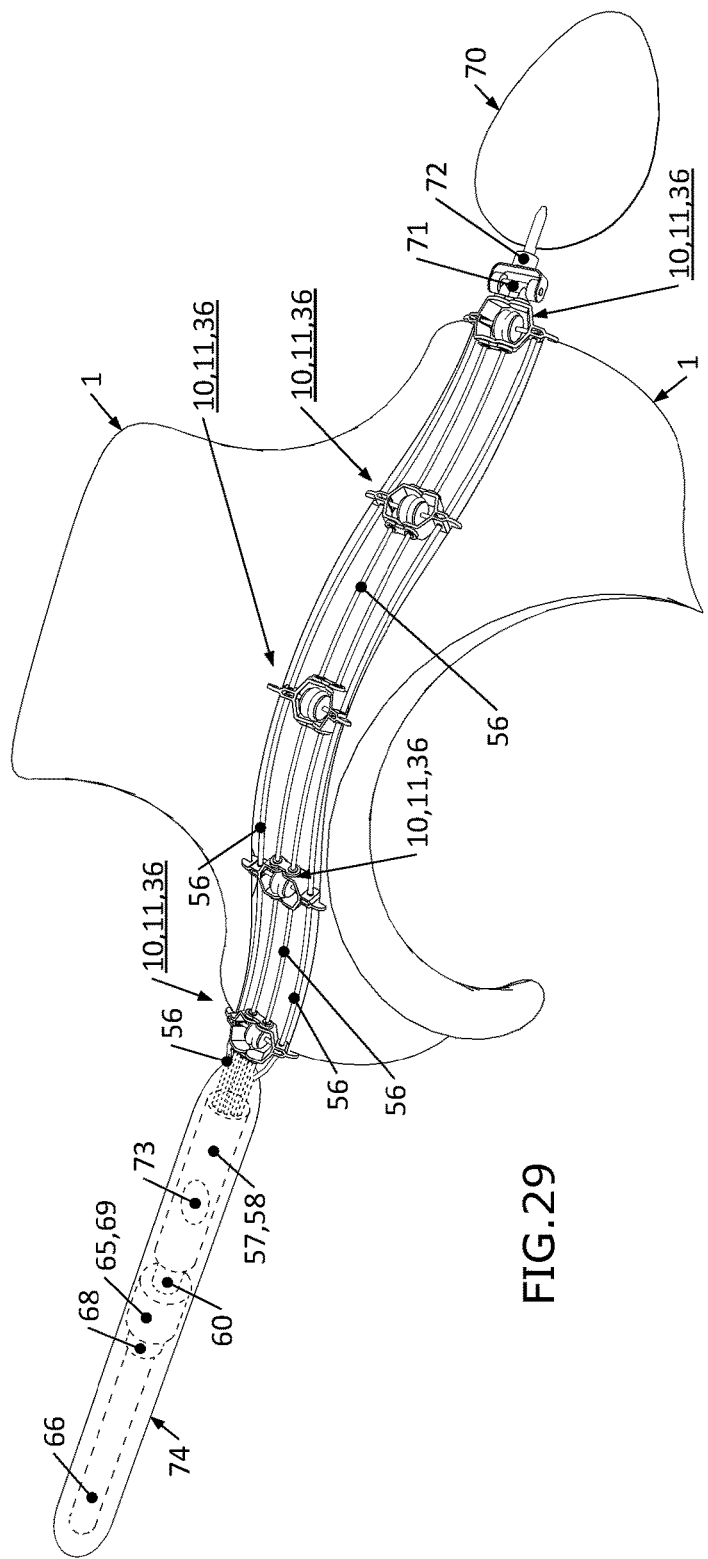
FIG. 29 illustrates a vehicle implementation in some embodiments.

For vehicle implementations, a central processor 68 may direct power from the battery 66 to turn a back-drivable electromagnetic generator 65, a motor 69, and/or the like to power a cam, crank, and/or the like 58, or double cam, crank, and/or the like 64, coupled to antagonistic bellows 57, which pump fluid via conduits or tubes 56 to sequentially expand and contract bellows 16, 39, 40 which reciprocally rotate the vertebrae 13 or lever arms 37 of the fin coupling modules 10, 11, 39 to drive the travel of wave-like deformations 6 along the fins 1, to create thrust when the vehicle is in ambient fluid 8. Vehicle travel direction may be controlled, e.g., by a rudder 70 at the fore. In some implementations, the rudder 70 may have at least two motors, e.g., a pitch control motor 71 and a yaw control motor 72. In some implementations, an inertial measurement unit, or IMU 73 may feed data to the central processor 68 which May control the rudder via the pitch control motor 71 and yaw control motor 72. The battery 66, central processor 68, IMU 73, motor 69, gear box 60, cam or crank 58, or double cam or crank 64 and antagonistic bellows 57 may be contained within a hull or cowling 74, FIG. 29.

Figure 30:
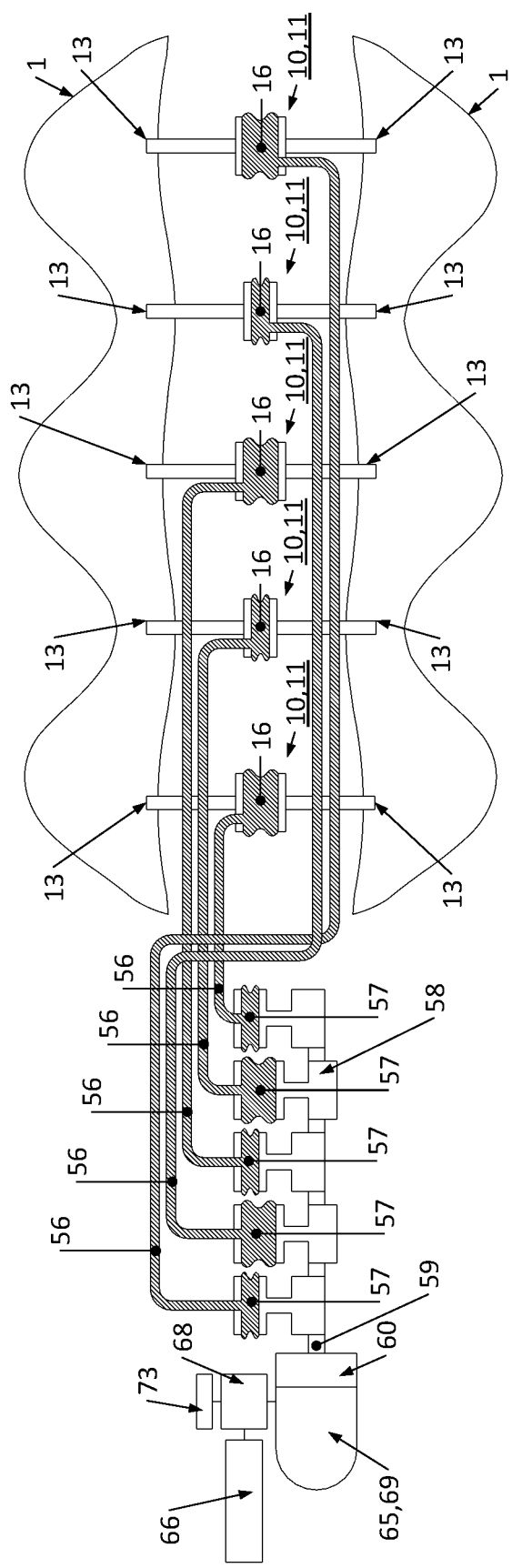
FIG. 30 is a diagrammatic illustration of a vehicle implementation in some embodiments.

FIG. 30 illustrates a first vehicle implementation, wherein a central processor 68 directs power from a battery 66 or other power source to turn a back-drivable electromagnetic generator 65, or a motor 69, to power a cam or crank 58, coupled to antagonistic bellows 57, which pump fluid via conduits or tubes 56 to sequentially expand and contract bellows 16, which reciprocally rotate the vertebrae 13 of the fin coupling modules 10, 11 to drive the travel of wave-like deformations 6 along the fins 1, to create thrust when the vehicle is in ambient fluid 8.

Figure 31:
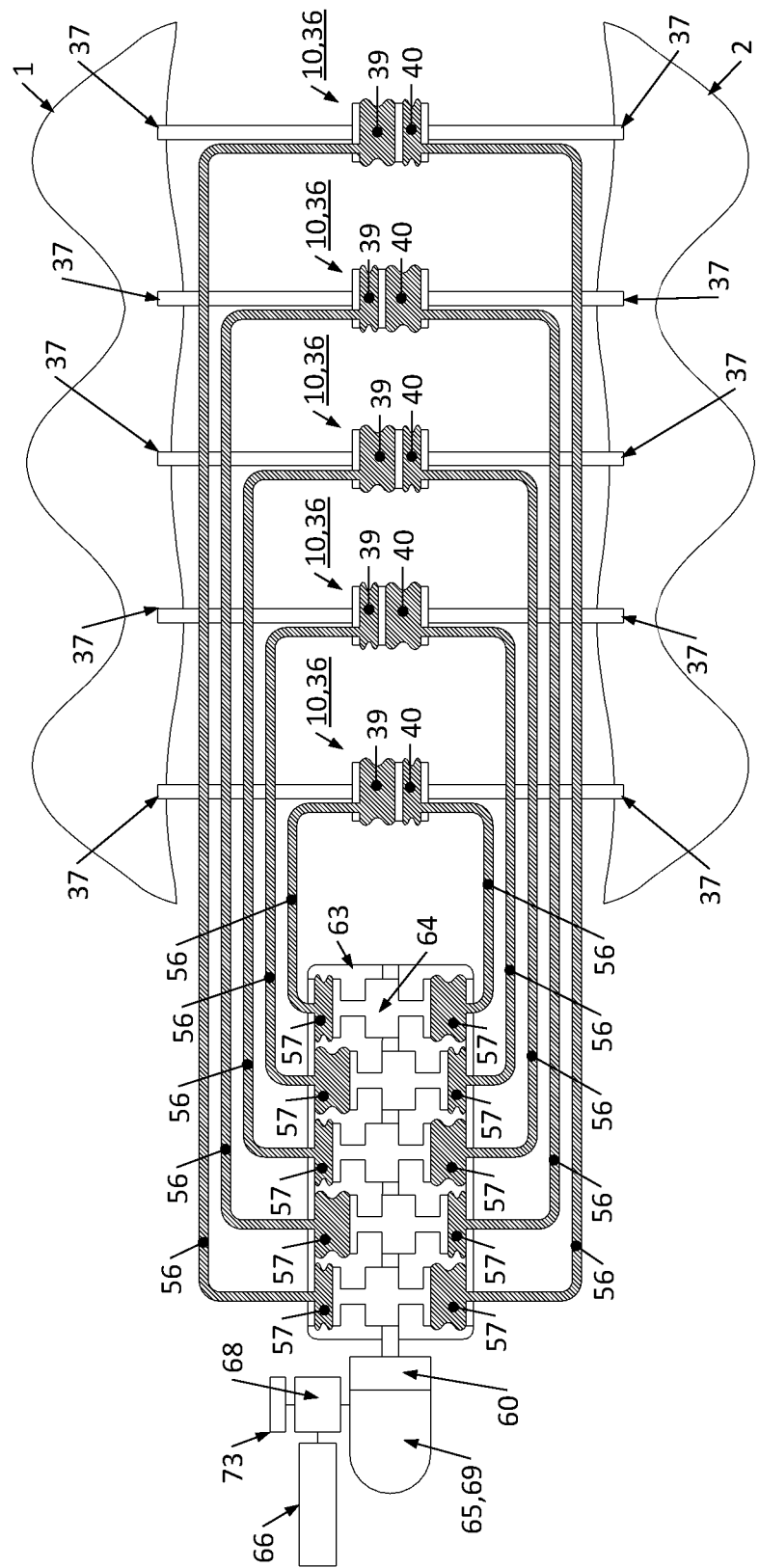
FIG. 31 is a diagrammatic illustration of another vehicle implementation in some embodiments.

FIG. 31 illustrates a second vehicle implementation, wherein a central processor 68 directs power from a battery 66 or other power source to turn a back-drivable electromagnetic generator 65, or a motor 69, to power a double cam or crank 64, coupled to antagonistic bellows 57, which pump fluid via conduits or tubes 56 to sequentially expand and contract bellows 39,40, which reciprocally rotate the vertebrae 37 of the fin coupling modules 10, 39 to drive the travel of wave-like deformations 6 along the fins 1, to create thrust when the vehicle is in ambient fluid 8.

Figure 32:
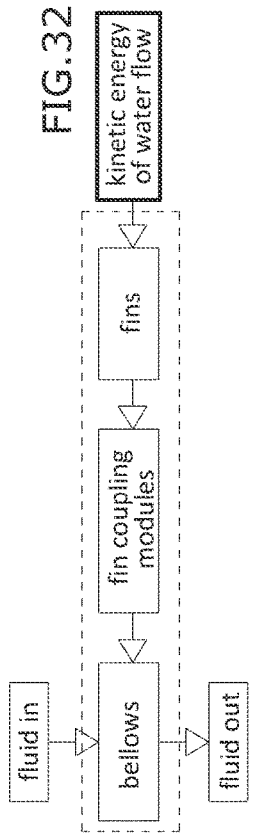
FIG. 32 is a diagrammatic illustration indicating direction of energy transfer and fluid flow in a pump embodiment.
Figure 33:
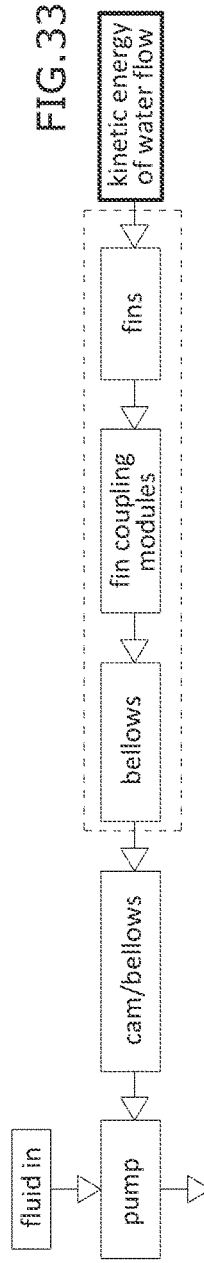
FIG. 33 is a diagrammatic illustration indicating direction of energy transfer and fluid flow in a pump embodiment.
Figure 34:
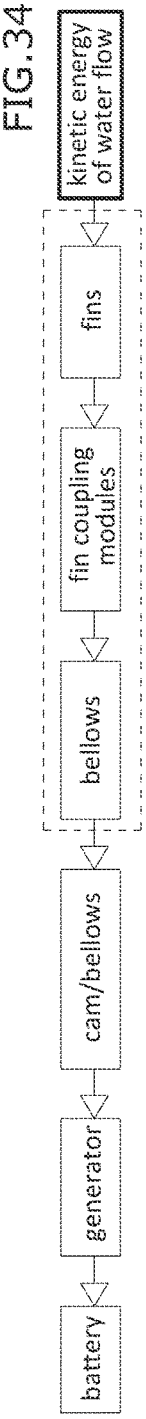
FIG. 34 is a diagrammatic illustration indicating direction of energy transfer in a generator embodiment.
Figure 35:
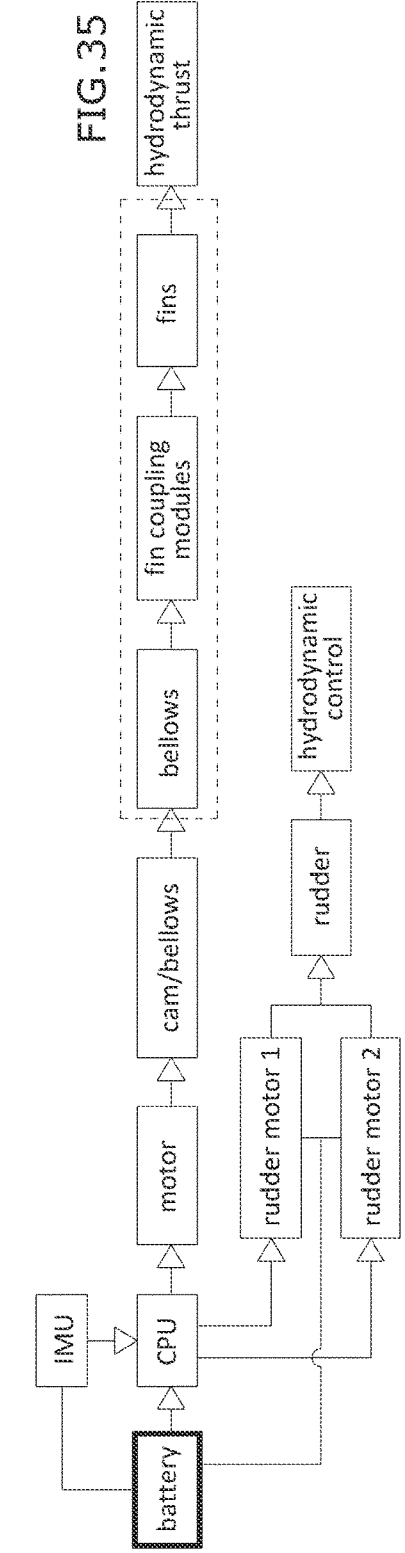
FIG. 35 is a diagrammatic illustration indicating direction of energy transfer in a vehicle embodiment

FIGS. 32-35 diagrammatically illustrate the direction of energy, information and fluid flow in some embodiments described, with the components that may be common to all embodiments indicated with a dashed line box. FIG. 32 diagrammatically illustrates a first category of pump apparatuses. FIG. 33 diagrammatically illustrates a second category of pump apparatuses. FIG. 34 diagrammatically illustrates a generator implementation. FIG. 35 diagrammatically illustrates a vehicle propulsion implementation.

What is claimed is:

1. A mechanism, comprising:
    two fins wherein each of the fins has a contact surface configured with at least one persistent strained deformation;
    a plurality of fin-coupling modules coupled to respective inner edges of the two fins, wherein each of the fin-coupling modules comprises at least one bellows;
    a plurality of antagonistic bellows, wherein each of the at least one bellows of the plurality of fin-coupling modules is coupled via a conduit to at least one of the plurality of antagonistic bellows;
    a plurality of cams, wherein each of the plurality of cams is coupled at a first end to one of the plurality of antagonistic bellows and at a second end to a common shaft;
    a power extraction device coupled to the common shaft and configured to extract power upon rotation of the common shaft.

2. The mechanism of claim 1, wherein the plurality of cams are enclosed in a structural case.

3. The mechanism of claim 1, wherein the power extraction device comprises a pump.

4. The mechanism of claim 3, wherein the pump further comprises a fluid inlet and a fluid outlet.

5. The mechanism of claim 3, wherein the pump comprises a centrifugal pump.

6. The mechanism of claim 1, wherein the power extraction device comprises a generator.

7. The mechanism of claim 1, further comprising:
    a gearbox coupled to the common shaft and the power extraction device, wherein rotation of the common shaft engages the gearbox to provide power to the power extraction device.

8. The mechanism of claim 1, wherein each of the plurality of fin-coupling modules comprises a type two fin coupling module.

9. The mechanism of claim 1, wherein each of the plurality of fin-coupling modules further comprises:
    a plurality of lever arms, wherein each of the plurality of vertebrae lever arm comprises toothed gearing and is coupled to the respective inner edges of a corresponding one of the two fins;
    a structural bracket, wherein each of the plurality of lever arms are rotationally coupled to the structural bracket;
    a central chamber comprising linear gears, wherein the central chamber is coupled to the plurality of lever arms by engagement of the linear gears to the toothed gearing of each of the plurality of lever arms such that reciprocal rotation of the lever arms raises and lowers the central chamber; and
    at least one bellows coupled at a first end to the central chamber and at second end to the structural bracket, such that raising and lowering of the central chamber compresses or extends the at least one bellows.

10. The mechanism of claim 1, wherein each of the plurality of fin-coupling modules comprises a type one fin coupling module.

11. A mechanism, comprising:
    two fins, wherein each of the fins has a contact surface configured with at least one persistent strained deformation;

a plurality of fin-coupling modules coupled to respective inner edges of the fins, wherein each of the fin-coupling modules comprises at least one bellows;

a plurality of antagonistic bellows, wherein each of the at least one bellows of the plurality of fin-coupling modules is coupled via at least two conduits to at least two of the plurality of antagonistic bellows;

a plurality of double cams, wherein each of the plurality of double cams is coupled at a first end to one of the plurality of antagonistic bellows, at a second end to an opposite one of the plurality of antagonistic bellows, and at an intermediate point to a common shaft;

a power extraction device coupled to the common shaft and configured to extract power upon rotation of the common shaft.

12. The mechanism of claim 11, wherein the plurality of cams are enclosed in a structural case.

13. The mechanism of claim 11, wherein the power extraction device comprises a pump.

14. The mechanism of claim 13, wherein the pump further comprises a fluid inlet and a fluid outlet.

15. The mechanism of claim 13, wherein the pump comprises a centrifugal pump.

16. The mechanism of claim 11, wherein the power extraction device comprises a generator.

17. The mechanism of claim 11, further comprising:

a gearbox coupled to the common shaft and the pump, wherein rotation of the common shaft engages the gearbox to provide power to the pump.

18. The mechanism of claim 11, wherein each of the plurality of fin-coupling modules comprises a type two fin coupling module.

19. The mechanism of claim 11, wherein each of the plurality of fin-coupling modules further comprises:

a plurality of lever arms, wherein each of the plurality of lever arms comprises toothed gearing and is coupled to the respective inner edges of a corresponding one of the plurality of fins;

a structural bracket, wherein each of the plurality of lever arms are rotationally coupled to the structural bracket;

a central chamber comprising linear gears, wherein the central chamber is coupled to the plurality of lever arms by engagement of the linear gears to the toothed gearing of each of the plurality of lever arms such that reciprocal rotation of the lever arms raises and lowers the central chamber; and at least one bellows coupled at a first end to the central chamber and at a second end to the structural bracket, such that raising and lowering of the central chamber compresses or extends the at least one bellows.

20. The mechanism of claim 11, wherein each of the plurality of fin-coupling modules comprises a type one fin coupling module.

21. A vehicle, comprising:

two fins wherein each of the fins has a contact surface configured with at least one persistent strained deformation;

a plurality of fin-coupling modules coupled to respective inner edges of the two fins, wherein each of the fin-coupling modules comprises at least one bellows;

a plurality of antagonistic bellows, wherein each of the at least one bellows of the plurality of fin-coupling modules is coupled via a conduit to at least one of the plurality of antagonistic bellows;

a plurality of cams, wherein each of the plurality of cams is coupled at a first end to one of the plurality of antagonistic bellows and at a second end to a common shaft;

a motor coupled to the common shaft and configured to rotate the common shaft to cause the plurality of cams to compress and extend the plurality of antagonistic bellows to actuate the plurality of fin-coupling modules to create traveling wave undulations in the two fins for propulsion.

22. A vehicle, comprising:

two fins wherein each of the fins has a contact surface configured with at least one persistent strained deformation;

a plurality of fin-coupling modules coupled to respective inner edges of the two fins, wherein each of the fin-coupling modules comprises at least one bellows;

a plurality of antagonistic bellows, wherein each of the at least one bellows of the plurality of fin-coupling modules is coupled via a conduit to at least one of the plurality of antagonistic bellows;

a plurality of double cams, wherein each of the plurality of double cams is coupled at a first end to one of the plurality of antagonistic bellows, at a second end to an opposite one of the plurality of antagonistic bellows, and at an intermediate point to a common shaft;

a motor coupled to the common shaft and configured to rotate the common shaft to cause the plurality of double cams to compress and extend the plurality of antagonistic bellows to actuate the plurality of fin-coupling modules to create traveling wave undulations in the two fins for propulsion.

* * * * *